Patented July 28, 1936

2,048,685

UNITED STATES PATENT OFFICE 2,048,685

PROCESS OF MAKING CELLULOSE ESTERS AND THE PRODUCTS RESULTING THEREFROM

Hans T. Clarke, New York, and Carl J. Malm, Rochester, N. Y., assignors to Eastman Kodak Company, Rochester, N. Y., a corporation of New York No Drawing. Application March 4, 1931, Serial No. 520,149

23 Claims. (Cl. 260—101)

This invention relates to processes of making organic esters of cellulose in which the fatty acids of 3-4 carbon atoms or any mixture of these and a lower anhybrid are employed, preferably with the aid of a catalyst, and to products resulting therefrom. The lower anhydrids are also to be understood as including those anhydrids which are derivatives of a fatty acid having less carbon atoms than the particular fatty acid of 3-4 carbon atoms used, as well as the unsubstituted anhydrids. For example, if propionic acid is employed, some of the lower anhydrids which would be suitable to co-act therewith would be acetic anhydrid, chloracetic anhydrid, or methoxy or ethoxy acetic anhydrid.

This application is in part a continuation of our applications Serial Nos. 179,176 and 179,177 filed March 28, 1927, now Patents Nos. 1,800,860 and 1,880,808 respectively.

One object of our invention is to provide a process by which the simple or mixed esters of cellulose containing propionyl and/or butyryl groups are produced with the aid of the propionic or butyric acids without the necessity of adding the anhydrids of these particular acids.

Another object of our invention is to provide a process in which there is employed an organic acid anhydrid, which anhydrid impels the entrance of propionyl or butyryl groups into the cellulose molecule. In one form of our invention, the anhydrid impels esterification of the cellulose by the fatty acid or acids present in the esterification bath without itself contributing any acyl groups to the ester. In another form of our invention, the anhydrid itself contributes acyl groups as well as impels the entrance of higher acyl groups so that a mixed ester is formed.

Another object of our invention is to provide a process by which not only easily esterified cellulosic bodies such as hydrocellulose, reverted cellulose, and cellulose ethers can be esterified, but by which one can also esterify substantially undegraded cellulose such as cotton, surgical cotton wool, tissue paper from cotton stock and even sulfite wood pulp, thereby producing cellulose esters of high quality or by which even chemically affected cellulose such as cellulose acetate, formate, nitrate or the like may be esterified.

Another object of our invention is to provide a product which is suitable for making film, artificial silk, sheeting and various other articles which are now made of the nitrates or acetates of cellulose. Our product is commercially useful instead of being a chemical curiosity as is taught in the prior art with reference to some types of cellulose acetate-propionates or butyrates.

Another object of our invention is to provide a product of improved properties (solubility, flexibility, strength, etc.) over the acetate-propionates or butyrates known prior to our invention. Our product is especially valuable when colloidized as will be described herein.

Another object of our invention is to provide an esterifying process in which the ingredients of the esterifying bath are active and yet do not degrade the cellulose or the esters produced at the temperatures used in the process.

Our process comprises the butyration or propionation (or both) of cellulose or partly acylated cellulose by the use of butyric or propionic acid and an anhydrid which impels the esterification. It is preferred that a solvent of the resulting esters and a catalyst be present in the bath. After the esterification has taken place the product is precipitated by adding the dope to a precipitant such as water or methyl alcohol, washed and dried. To convert the ester into a preferred form for commerce, it may be dissolved in an organic solvent such as acetone or ethylene chloride and the solvent evaporated off, leaving the ester in colloidized form.

Our process utilizes for the impelling agent to cause the esterification of the cellulose by the propionic and butyric acids, either acetic anhydrid or its alkoxy or halogen substituted derivatives or if desired a mixture of acetic and alkoxy acetic anhydrids. The alkoxy acetic anhydrid preferred is the ethoxy substituted compound although the methoxy substituted and the higher alkoxy substituted acetic anhydrids have been found suitable as well as the chloracetic anhydrids.

When butyric acid is used for the esterification of the cellulose, the impelling agent may be propionic anhydrid, chlorpropionic anhydrid or an alkoxy propionic anhydrid, instead of the acetic anhydride or its derivatives, if desired.

In carrying out our process glacial acetic acid is usually employed as the solvent of the acids, anhydrids and the ester resulting from the reaction although other solvents such, for example, as ethylene chloride may also be either added thereto or substituted for the acetic acid. Also the propionic acid itself may be added in sufficient amount to also act as the solvent in the reaction mass although this would not be the most economical. At the end of the esterification, when sufficient solvent is present, the organic ester or cellulose resulting from the reaction is found to be in solution.

Although there are impurities in the technical anhydrids which exert a catalytic effect on the reaction it is preferred that a catalyst, such as sulfuric acid, perchloric acid, magnesium perchlorate, zinc chloride, para toluene sulfo-chloride, benzene sulfonic acid or the like which are commonly employed for acylation of cellulose, be added to the mass.

Examples illustrative of our invention are as follows:

I. An esterifying bath is prepared comprising 20 parts by weight propionic acid, 15 parts by weight of acetic anhydrid and 5 parts by weight of glacial acetic acid. There is also thoroughly incorporated into this bath one part by weight of fused zinc chloride as a catalyst. 5 parts by weight of purified cotton are thoroughly mixed into this bath and the latter maintained at 60° to 65° C. until a clear mixture or dope results. This generally takes place in 35 hours or less. The resulting ester is isolated by pouring into water, washing and drying, as is customary in making unmixed cellulose esters. The product contains not only acetyl groups but enough propionyl groups to make the product soluble in acetone, methyl acetate, and in chloroform. It is also soluble in ethyl acetate and ethylene chloride. The product is cellulose acetate propionate, is substantially fully esterified and contains 32% acetyl and 15% propionyl.

II. An esterifying bath is prepared comprising 475 pounds of butyric acid, 300 pounds of acetic anhydrid, 100 pounds glacial acetic acid and 1 pound magnesium perchlorate trihydrate. 100 pounds of purified cotton are thoroughly mixed into this bath and the latter is maintained at 60°–65° C. until a clear mixture or dope results as above. After precipitating, washing and drying, the product is found to be soluble in acetone, ethyl acetate, ethylene chloride and chloroform. The product is cellulose acetate butyrate, is substantially fully esterified and contains 31% acetyl and 18% butyryl.

III. An esterifying bath is prepared comprising 280 pounds propionic acid, 70 pounds glacial acetic acid, 150 pounds acetic anhydrid (85%) and ½ pound sulfuric acid (sp. gr. 1.85). 50 pounds of purified cotton are thoroughly mixed into this bath and the latter is allowed to rise from 60°–100° F. through a period of 5 hours, and a clear mixture or dope results. The product is precipitated, washed and dried and is found to be soluble in acetone, ethyl acetate, ethylene chloride and chloroform. The product is cellulose acetate propionate, is substantially fully esterified and contains 30% acetyl and 18% propionyl.

IV. An esterifying bath is prepared comprising 200 pounds propionic acid, 150 pounds acetic anhydrid (85%), 150 pounds ethylene dichloride and ½ pound sulfuric acid (spr. gr. 1.85). 50 pounds of cotton are treated in this bath in the manner disclosed in the preceding example. The resulting product is soluble in acetone, ethyl acetate, ethylene chloride and chloroform. The product is cellulose acetate butyrate, is substantially fully esterified and contains 30% acetyl and 17% propionyl.

Our process may also be utilized for producing the mixed esters of cellulose in fibrous form as shown by the following example:

100 parts by weight of propionic acid containing 1 part by weight of perchloric acid are thoroughly mixed into 10 parts by weight of cotton fibers and the excess squeezed out by pressure until 55 parts by weight of propionic acid are left in contact with the cotton fibers. The latter are then thoroughly mixed into 320 parts of carbon tetrachloride and 40 parts by weight of acetic anhydrid. The reaction mixture is then allowed to stand at room temperature until a sample is found to be soluble in acetone. The premixing with the propionic acid, occupies only a very short interval of time, just long enough to get each fiber intimately wetted with the acid. No acylation of the cotton is produced in this brief interval of pretreatment.

From the above examples it will be observed that it is preferred that the available acyl radicals of 3–4 carbon atoms in the acylation bath be at least equal to and preferably in excess of the available lower acyl radicals and that the higher acyl radicals be supplied by the acid or acids of 3–4 carbon atoms and the lower acyl esterification radicals by the lower acid anhydride. All of the available esterification radicals present in the esterification bath must be taken into account. Of course, should one employ a substituted anhydrid as the impeller, one would have to have present in the bath, at least two fatty acids of 2–4 carbon atoms in order to obtain from cellulose the mixed esters of our invention. Obviously, if one starts with cellulose acetate, the anhydrid employed would impel acyl radicals of 3–4 carbon atoms into the cellulose acetate molecule. Variations of this principle will, of course, occur to those skilled in the art and are to be included in the scope of this invention if contemplated hereby.

It is to be understood that where the term butyric acid is used herein it refers to both the normal form of this acid and to its isomeric form.

It is also to be understood that instead of using the propionic or butyric acids individually, the acids may be mixed and thus a cellulose ester containing both propionyl and butyryl groups will be produced. Also instead of using acetic anhydrid alone it may be mixed with a chloracetic anhydrid or an alkoxy acetic anhydrid in carrying out the process. Where butyric acid is used, the impelling agent may be propionic anhydrid or a mixture of acetic and propionic anhydrids or each or both of these may also be mixed with a chloracetic or alkoxyacetic anhydrid. In fact as pure propionic anhydrid is more expensive than technical propionic anhydrid which may contain appreciable percentages of acetic and butyric anhydrids, it will be understood that both types of propionic anhydrid are referred to herein as propionic anhydrid.

We have found our cellulose acetate-propionates, acetate butyrates, and acetate-propionate-butyrates to be soluble in ethylene chloride, acetone, ethyl acetate and chloroform directly from the reaction mass without any necessity of hydrolyzing or deacylating.

The preparation of compositions of matter, or articles therefrom, by dissolving the cellulose mixed organic esters or the cellulose higher esters in ethylene chloride is not our joint invention but is the sole invention of Carl J. Malm, one of the applicants herein, as set forth in his application Serial No. 551,545, filed July 17, 1931.

The mixed esters produced by our process, when colloidized such for example, as by dissolving in acetone and then evaporating off the solvent to form film, sheets, coatings, filaments, etc. are especially valuable. Films, sheets and the like are formed by coating solutions of the ester upon wheels, for instance, as shown in the Sulzer Patent No. 1,466,733. Sheets so produced are very useful as photographic film base for the reason that the sheets have the property of flatness (lying flat) to an unusual degree. Ordinary cellulose acetate sheets may be enhanced in flatness by coating them with solutions of our acetate-propionate or by laminating them with thin sheets of acetate-propionate or by mixing acetate-propionate with the acetate before coating.

Films, thin sheets (such as for wrapping purposes) artificial silk filaments and the like produced from solutions of our cellulose acetate-propionate also are more water resistant than for instance, cellulose acetate products. Also due to this fact, thin sheeting of cellulose acetate-propionate does not warp or wrinkle under humid conditions to the extent that some other sheetings do.

In producing artificial silk, a solution of the cellulose acetate-propionate in acetone, for instance, is extruded through fine orifices into a closed chamber through which passes a current of heated air to coagulate the filament. The filament is then led out from the chamber to an outside wind-up or cap spinning device, as known for decades in the art. The thread may, of course, pass over lubricating, dyeing or other treating stations during its production.

Lacquers with highly useful properties may also be compounded in known manner from our cellulose aceto-propionates.

Other uses for our products as well as variations in their methods of manufacture may be suggested from time to time by those skilled in the art and the scope of our invention is to be determined only by the claims appended hereto.

What we claim as our invention and desire to secure by Letters patent of the United States is:

1. A process of making a mixed organic acid ester of cellulose which comprises acylating cellulose or a cellulose compound containing esterifiable hydroxyl groups with a reaction mixture containing a fatty acid of 3–4 carbon atoms, a lower organic acid anhydride, and glacial acetic acid.

2. A process of making a cellulose ester which comprises acylating cellulose or a cellulose compound containing esterifiable hydroxyl groups with a reaction mixture containing a fatty acid of 3–4 carbon atoms and a substituted lower organic acid anhydride.

3. A process of making a mixed organic acid ester of cellulose which comprises acylating cellulose or a cellulose compound containing esterifiable hydroxyl groups with a reaction mixture containing a fatty acid of 3–4 carbon atoms and a lower organic acid anhydride.

4. A process of making a mixed organic acid ester of cellulose which comprises acylating cellulose or a cellulose compound containing esterifiable hydroxyl groups with a reaction mixture containing butyric acid and a lower organic acid anhydride.

5. A process of making a mixed organic acid ester of cellulose which comprises acylating cellulose or a cellulose compound containing esterifiable hydroxyl groups with a reaction mixture containing propionic acid and a lower organic acid anhydride.

6. A process of making a mixed organic acid ester of cellulose which comprises acylating cellulose or a cellulose compound containing esterifiable hydroxyl groups with a reaction mixture containing a fatty acid of 3–4 carbon atoms and acetic anhydride.

7. A process of making a mixed organic acid ester of cellulose which comprises acylating cellulose or a cellulose compound containing esterifiable hydroxyl groups with a reaction mixture containing butyric acid and acetic anhydride.

8. A process of making a mixed organic acid ester of cellulose which comprises acylating cellulose or a cellulose compound containing esterifiable hydroxyl groups with a reaction mixture containing propionic acid and acetic anhydride.

9. A process of making a mixed organic acid ester of cellulose which comprises acylating cellulose or a cellulose compound containing esterifiable hydroxyl groups with a reaction mixture containing a fatty acid of 3–4 carbon atoms, a lower organic acid anhydride and a common solvent.

10. A process of making a mixed organic acid ester of cellulose which comprises esterifying cellulose with a reaction mixture containing a fatty acid of three to four carbon atoms and a lower organic acid anhydride.

11. A process of making a mixed organic acid ester of cellulose which comprises esterifying cellulose with a reaction mixture containing butyric acid and acetic anhydride.

12. A process of making a mixed organic acid ester of cellulose which comprises esterifying cellulose with a reaction mixture containing propionic acid and acetic anhydride.

13. A process of making a mixed organic acid ester of cellulose which comprises treating cellulose or a cellulose compound containing esterifiable hydroxyl groups with a reaction mixture containing a fatty acid of 3–4 carbon atoms, a lower organic acid anhydride and a catalyst.

14. A process of making a mixed organic acid ester of cellulose which comprises acylating cellulose or a cellulose compound containing esterifiable hydroxyl groups with a reaction mixture containing propionic and butyric acids and a lower organic acid anhydride.

15. A process of making a mixed organic acid ester of cellulose which comprises acylating cellulose with a reaction mixture comprising propionic and butyric acids and a lower organic acid anhydride.

16. A process of making a mixed organic acid ester of cellulose which comprises acylating cellulose or a cellulose compound containing esterifiable hydroxyl groups with a reaction mixture comprising butyric and propionic acids and acetic anhydride.

17. A process of making a mixed organic acid ester of cellulose which comprises acylating cellulose or a cellulose compound containing esterifiable hydroxyl groups with a reaction mixture containing butyric acid and propionic anhydride.

18. A mixed organic acid ester of cellulose resulting from the acylating of a cellulose or a cellulose compound containing esterifiable hydroxyl groups with propionic and butyric acids and a lower organic acid anhydride.

19. A mixed organic acid ester of cellulose resulting from the acylating of a cellulosic material with butyric and propionic acids and acetic anhydride.

20. A substantially fully esterified mixed organic acid ester of cellulose containing a fatty acid radical of 3-4 carbon atoms and a lower fatty acid radical of more than one carbon atom.

21. Substantially fully esterified cellulose acetate propionate.

22. Substantially fully esterified cellulose acetate butyrate.

23. Substantially fully esterified cellulose acetate propionate-butyrate.

HANS T. CLARKE.
CARL J. MALM.